(12) United States Patent
Bhatia et al.

(10) Patent No.: US 11,093,496 B1
(45) Date of Patent: Aug. 17, 2021

(54) PERFORMANCE-BASED QUERY PLAN CACHING

(71) Applicant: Amazon Technologies, Inc., Seattle, WA (US)

(72) Inventors: Sandeep Bhatia, Bothell, WA (US); Kanishka Chaturvedi, Seattle, WA (US); Maruthi Manohar Reddy Devarenti, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 497 days.

(21) Appl. No.: 15/821,683

(22) Filed: Nov. 22, 2017

(51) Int. Cl.
*G06F 16/00* (2019.01)
*G06F 16/2453* (2019.01)
*G06F 16/2455* (2019.01)

(52) U.S. Cl.
CPC .. *G06F 16/24542* (2019.01); *G06F 16/24552* (2019.01)

(58) Field of Classification Search
None
See application file for complete search history.

(56) References Cited

U.S. PATENT DOCUMENTS

| | | | |
|---|---|---|---|
| 6,356,887 B1 | 3/2002 | Berenson et al. | |
| 7,640,230 B2 | 12/2009 | Hanson et al. | |
| 8,996,503 B2 | 3/2015 | Schneider et al. | |
| 8,996,504 B2* | 3/2015 | Aluc | G06F 16/24542 707/718 |
| 9,213,740 B2* | 12/2015 | Andrei | G06F 16/2453 |
| 9,229,981 B2* | 1/2016 | Eblighatian | G06F 3/0485 |
| 9,767,168 B2* | 9/2017 | Nguyen | G06F 16/2471 |
| 10,176,222 B2* | 1/2019 | Schneider | G06F 16/24542 |
| 10,496,644 B2* | 12/2019 | Chamieh | G06F 16/284 |
| 10,824,622 B2* | 11/2020 | Nica | G06F 16/24542 |
| 2010/0082507 A1* | 4/2010 | Ganapathi | G06F 16/217 706/12 |
| 2010/0082599 A1* | 4/2010 | Graefe | G06F 16/217 707/713 |
| 2017/0004173 A1* | 1/2017 | Simitsis | G06F 16/24542 |

\* cited by examiner

*Primary Examiner* — Debbie M Le
(74) *Attorney, Agent, or Firm* — Robert C. Kowert; Kowert, Hood, Munyon, Rankin & Goetzel, P.C.

(57) ABSTRACT

Performance-based caching may be implemented for query plan caches that are used to provide query plans to perform queries instead of generating query plans to perform queries. Performance metrics for queries performed at a database may be collected and used to cache query plans generated for the queries. When a query is received that matches one of the queries, the cached plan corresponding to the matching query may be used to perform the query.

20 Claims, 9 Drawing Sheets

PERFORMANCE-BASED QUERY PLAN CACHING

BACKGROUND

Query planning techniques provide database systems and other storage services that provide users with access to data according to queries with different solutions for optimizing the execution of operations to perform a query. A query plan may, for instance, identify an order of operations to perform, the types of operations to perform, and other information to perform the query so that a query engine can perform a query efficiently. Query planning may involve the selection of cost optimal operations or comparison between alternative query plans in order to identify a query plan best suited to carry out performance of a query. Query planning, however, is not without cost. The resources and time spent query planning can reduce the resources available to process other queries or perform other work. Techniques that reduce the burden of query planning without sacrificing the benefits of query planning are thus highly desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein implement performance-based caching for query plans, according to some embodiments. Query plans may be generated in order to perform queries that are received at query engine for a database, in various embodiments. The query engine may evaluate alternative plans, examine statistics describing the content of a database, re-order or reconfigure operations, among other query planning techniques, in order to select a query plan that is optimal for performing a query, in various embodiments. Because queries can be repeated, the plan generated for the query may be stored in a cache (e.g., in a memory for the query engine) so that it can be executed when the query is received again, instead of generating a new query plan, in some embodiments. Performance-based caching of query plans may proactively manage the content of the plan cache in order to anticipate changes in workload, likely queries, and other scenarios so that the plan cache may continue provide a high hit rate for received queries without consuming too much memory or other cache storage that may be shared with other tasks or operations, in various embodiments.

Figure 1:
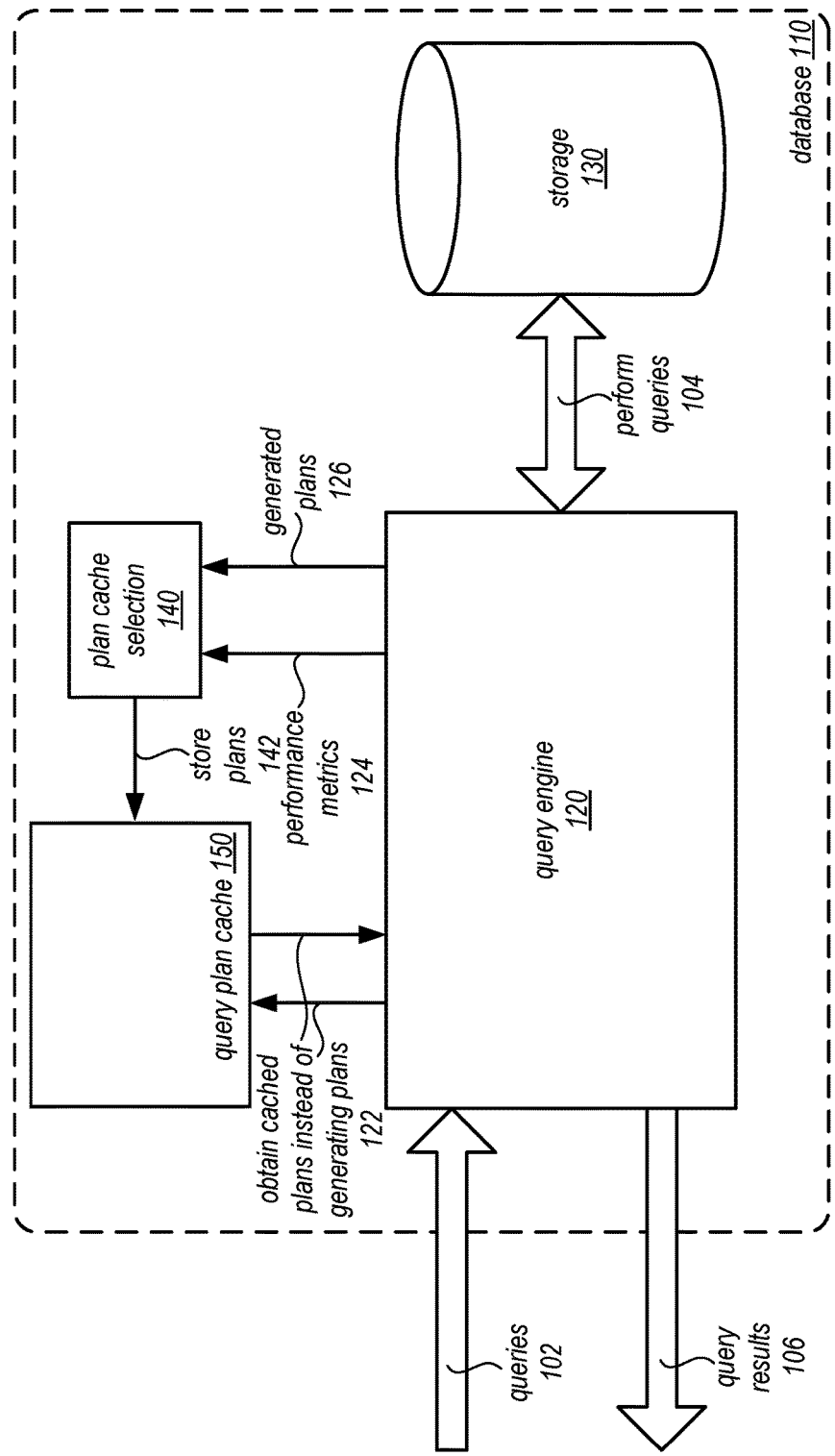
FIG. 1 is a logical block diagram illustrating performance-based caching of query plans, according to some embodiments.

FIG. 1 is a logical block diagram illustrating performance-based caching of query plans, according to some embodiments. Database 110 may provide access to data stored on behalf the database in storage 130 via query engine 120. Database 110 may be a relational, non-relational, or other various kinds of database that process queries to access data. Query engine 120 may receive quer(ies) 102 from one or multiple clients in order to access data in storage 130. For example, a Structured Query Language (SQL) statement may be received via an interface to database 110, which query engine 120 may interpret.

Database 110 may implement query plan cache 150 to store query plans for performing queries, instead of generating a new query plan. For example, query plan cache 140 may be stored as part of a memory or other storage device accessible to query engine 120 in order to quickly obtain a query plan to perform a query 102. As illustrated in FIG. 1, if query engine 120 determines that a query 102 has a corresponding plan present in query plan cache 140, then query engine 120 may obtain the cached plan instead of generating a plan for the query. For example, query engine 120 may determine a signature value for a query 102 which may be compared with a list of signature values with corresponding plans in query plan cache 140. If the signature value has a match, then the corresponding plan may be retrieved from query plan cache 150. Once obtained, query engine 120 may perform various operations to perform the queries 104.

Performance metrics 124 for query plans, the query engine, and other features of database 110 (including multiple storage nodes or hosts for different respective query engines accessing the same database) may be used to determine how caching of query plans is performed, in some embodiments. Other criteria, such as user selected or supplied information for including or excluding types of queries in query plan cache 140 may also be used to determine how caching of queries is performed, in some embodiments. Plan cache selection 140 may, for instance be implemented as part of a controller or other management component for query plan cache 150 in order to determine the contents and configuration of query plan cache 150. For example, as discussed below with regard to FIG. 6, a cache profile may be created based on the performance metrics which may provide eviction techniques, inclusion techniques, queries with which to populate the query plan cache, among other cache management operations which may provide or lead to plan cache selection 140. Plans that are generated 126 for inclusion in query plan cache 150 may not necessarily be included according to the perform-based selections for caching. For those plans that are stored 142, subsequent queries may make use of the stored plans, instead of generating new query plans.

Because performance metrics are used to provide decisions for including, excluding, sizing, or otherwise managing the contents of query plan cache, predicative analysis, such as time series analysis, machine learning analysis, and other types of may be implemented to adapt the content of query plan cache 150 to suit the current behavior of the system before degraded performance of the cache is reached, in various embodiments. For example, plan cache selections 140 may change what is included (or excluded as plans) in the cache in order to prepare the cache for a predicted change in workload (e.g., from analytical, batch or (OLAP) processing to online transaction processing (OLTP)-style processing). As discussed below with regard to FIG. 8, performance-based selection can identify likely queries to be seen for a database so that query plan cache 150 can be populated prior to receiving a query from a client according to seed queries that are likely to be received at query engine 120.

Please note that previous descriptions of a query plan cache, plan cache selection, query engine, storage, and database are not intended to be limiting, but are merely provided as logical examples. Different implementations of a database, query engine, or storage, may be conceived.

This specification begins with a general description of a provider network that may implement a database service that may implement performance-based caching of query plans in some embodiments. Then various examples of a database service are discussed, including different components/modules, or arrangements of components/module, that may be employed as part of implementing the database service, in some embodiments. A number of different methods and techniques to implement performance-based caching of query plans are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
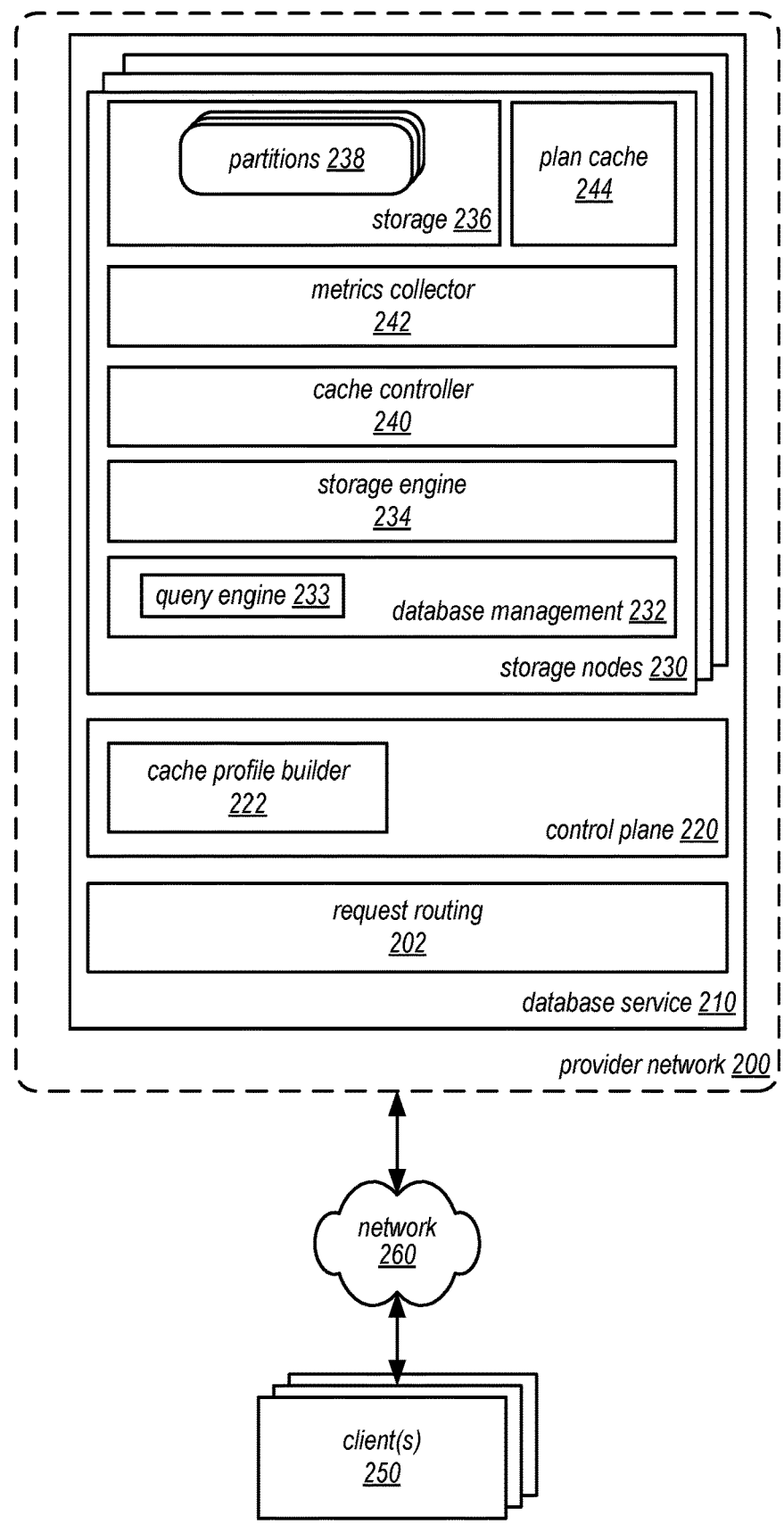
FIG. 2 is a logical block diagram illustrating a provider network that implements a database service that implements performance-based caching of query plans, according to some embodiments.

FIG. 2 is a logical block diagram illustrating a provider network that implements a database service that implements performance-based caching of query plans, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 250, in another embodiments. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may implement various computing resources or services, such as database service 210 or other data processing (e.g., relational or non-relational (NoSQL) database query engines, map reduce processing, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 9 and described below. In some embodiments, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in some embodiments, (such as various kinds of relational, non-relational and/or NoSQL databases) for storing, querying, and updating data. Such database services 210 may be enterprise-class database systems that are highly scalable and extensible. In some embodiments, queries may be directed to a database in database service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via a query language interface to the database system. In other embodiments, external applications and programs may submit queries using driver interfaces to the database system.

In some embodiments, clients 250 may encompass any type of client configurable to submit network-based requests to provider network 200 via network 260, including requests for database service(s) 210 (e.g., to query a database stored in database service 210 that utilizes query plans cached based on performance metrics). For example, in some embodiments a given client 250 may include a suitable version of a web browser, or may include a plug-in module or other type of code module may execute as an extension to or within an execution environment provided by a web browser. Alternatively in a different embodiment, a client 250 may encompass an application such as a database application (or user interface thereof), a media application, an office application or any other application that may make use of storage resources in data storage service(s) to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200, in some embodiments. In some embodiments, client 250 may generate network-based services requests according to a Representational State Transfer (REST)-style network-based services architecture, a table- or message-based network-based services architecture, or another suitable network-based services architecture.

In some embodiments, a client 250 may provide access to provider network 200 to other applications in a manner that is transparent to those applications. For example, client 250 may integrate with a database on database service(s) 210. In such an embodiment, applications may not need to be modified to make use of the storage system service model. Instead, the details of interfacing to the database service(s) 210 may be coordinated by client 250.

Clients 250 may convey network-based services requests to and receive responses from provider network 200 via network 260, in some embodiments. In some embodiments, network 260 may encompass any suitable combination of networking hardware and protocols necessary to establish network-based-based communications between clients 250 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Database service 210 may implement request routing 202, in some embodiments. Request routing may receive, authenticate, parse, throttle and/or dispatch service requests, among other things, in some embodiments. In some embodiments, database service 210 may implement control plane 220 to implement one or more administrative components, such as automated admin instances which may provide a variety of visibility and/or control functions, as described in more detail herein). In some embodiments, database service 210 may also implement multiple storage nodes 230, each of which may manage tables or other objects of a data set (e.g., a database) on behalf of clients/users or on behalf of the database service (and its underlying system) which may be stored in storage 236 (on storage devices attached to storage nodes 230) or, in another embodiment, in external storage which may be accessed by storage nodes 230 (e.g., via network connections) (not illustrated).

Control plane 220 may provide visibility and control to system administrators, detect split events for storage nodes, and/or anomaly control, resource allocation, in some embodiments. In some embodiments, control plane 220 may also include an admin console, through which system administrators may interact with the data storage service (and/or the underlying system). In some embodiments, the admin console may be the primary point of visibility and control for the data storage service (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as split requests to be processed, at storage service 230, in some embodiments.

Control plane 220 may direct the performance of different types of control plane operations among the nodes, systems, or devices implementing database service 210, in some embodiments. For instance, control plane 220 may communicate with storage nodes to initiate the performance of various control plane operations, such as moves, splits, update tables, delete tables, create indexes, etc. . . . In some embodiments, control plane 220 may update a task registry (or some other table or data structure) with the status, state, or performance information of the control plane operations currently being performed. In some embodiments, control plane 220 may implement cache profile builder 222, which may generate and provide cache profiles to cache controllers 240 according to the various techniques discussed below with regard to FIGS. 3 and 6.

In some embodiments, request routing 202 may support handling requests formatted according to an interface to support different types of web services requests. For example, in some embodiments, database service 210 may implement a particular web services application programming interface (API) that supports a variety of operations on tables (or other data objects) that are maintained and managed on behalf of clients/users by the data storage service system (and/or data stored in those tables). In some embodiments, database service 210 may support different types of web services requests. For example, in some embodiments, database service 210 may implement a particular web services application programming interface (API) that supports a variety of operations on tables (or other data objects) that are maintained and managed on behalf of clients/users by the data storage service system (and/or data stored in those tables). In some embodiments, request routing 202 may perform parsing and/or throttling of service requests, authentication and/or metering of service requests, dispatching service requests, and/or maintaining a partition assignments that map processing nodes to partitions.

Storage nodes 230 may implement database management 232, in some embodiments. Database management 232 may create, update, define, query, and/or otherwise administer databases, in some embodiments. For instance, database management 232 may maintain a database according to a database model (e.g., a non-relational database model). In some embodiments, database management 232 may allow a client to manage data definitions (e.g., Data Definition Language (DDL) requests to describe attributes, requests to add item attributes, etc.). In some embodiments, database management 232 may handle requests and other queries to access the data (e.g., to insert, modify, add, or delete data as well as return desired data) by implementing a query engine 233, similar to query engine 120 in FIG. 1. For example, the query engine may implement query parsing and validation, in some embodiments. Queries may be received at query engine 233, for example and checked for valid form, references, attributes, predicates, operators, etc. Query parsing and validation of query engine 233 may generate a parse tree or other parsed form or output of a query, which may identify predicates and the respective attributes of the predicates, in some embodiments. Query engine 233 may implement query planning and optimization to generate a query plan or other instructions to perform a query, in some embodiments. In at least some embodiments, the query plan may be optimized (e.g., for cost). Cost optimization may include identifying indexes as structures for quickly locating desired data in a query without performing a scan of an entire database. Therefore, query planning and optimization may identify predicates in a query, which are directed to a record, item, or attribute for which an index exists, in some embodiments.

Query engine 233 in distributed database management 232 may implement a query execution platform to perform the query plan (either generated or obtained from plan cache 244, in various embodiments. The query execution platform may issue storage requests to perform the query according to the plan (which may be received and interpreted by storage engine 234 in order to access the data the underlying storage). Storage responses may be received and evaluated to determine whether the returned data satisfies predicates of the query, in some embodiments. In at least some embodiments, caching or other buffering techniques may be implemented to store, for example, all or a portion of an index in memory for quick access. As illustrated in FIG. 2, plan cache 244 may be accessed by the query engine to retrieve plans that correspond to received queries, instead of generating a plan to perform the query. Query engine 233 may perform operations to join, filter, aggregate, order, or other predicates or operations specified or caused by queries as part of performing the query plan, in some embodiments. The query engine may provide the results queries to a client 250 via an interface for database service 210, in some embodiments.

In some embodiments, database management 232 may also perform other management functions, such as enforcing access controls or permissions, concurrency control, or recovery operations. In some embodiments, database management 232 may send requests to storage engine 234 to access tables 242 in order to process queries (e.g., requests to obtain the identify of tables with attributes specified in a query predicate).

In some embodiments, storage nodes 230 may implement storage engine 234 to access storage 236. Storage engine 234 may perform requests on behalf of database management to create, read, update and delete (CRUD) data in a partition, in some embodiments. Storage engine 234 may implement buffers, caches, or other storage components to reduce the number of times storage is accessed, in some embodiments. Storage engine 234 may implement various storage interfaces to access storage 236. In those embodiments where external storage is a network-based data storage service, like another data storage service in provider network 200 in FIG. 2, then storage engine 234 may establish a network connection with the service as part of obtaining access to a storage unit (e.g., by submit requests formatted according to a protocol or API to establish the connection). In another embodiment, storage engine 234 may access internal storage using storage protocols (e.g., Small Computer Systems Interface (SCSI)) over a bus or other interconnect that directly connects a host implementing storage engine 234 with storage 236).

In some embodiments, storage nodes 230 may implement cache controller 240. Cache controller 240 may manage plan cache 244 according to one or more cache profiles, in some embodiments, generated based on performance metrics. As discussed below with regard to FIGS. 3, 4, 7 and 8, cache controller 240 may perform various operations to manage plan cache 244, including sizing the plan cache, determining a number of and/or allocating slots for plans within plan cache 244, removing plans from plan cache 244, enforcing eviction techniques (e.g., most recently used, by query plan type, applying user selected or submitted criteria or prioritization schemes for evicting queries or query types, etc.), enforcing inclusion techniques (e.g., limiting cached plans to identified query plan types, applying user selected or submitted criteria or prioritization schemes for including queries or query types, etc.), or any other cache management operation, in some embodiments.

In some embodiments, storage nodes 230 may implement metrics collector 242. Metrics collector 242 may identify and send performance metrics for generating cache profiles, in some embodiments. For example, metrics collector 242 may interface with storage engine 234 or database management 232 (or a query engine within database management 232) to collect or register as a recipient of metrics generated by performance at the storage node. Metrics collector 242 may send or otherwise report the collected metrics to cache profile builder 222, in various embodiments. Although cache profile builder 222 is illustrated as part of control plane 220, in some embodiments, cache profile builder 222 may be implemented as part of a storage node 230, to generate cache profiles for a plan cache at the storage node 230.

Plan cache 244 may be a portion of a memory (e.g., memory 1020 in FIG. 9 below) which may be allocated for storing plans generated for previously received queries. Plan cache 244, along other caches or buffers for performing queries (e.g., results cache, page buffers, etc.). Plans may be stored in allocated portions or slots of plan cache 244.

In some embodiments, database service 210 may provide functionality for creating, accessing, and/or managing a table database at storage nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 3. Note also that in some embodiments, one or more storage nodes 230 process queries and other access requests on behalf of clients directed to tables. Some of these storage nodes may operate as if they were in a multi-tenant environment, and others may operate as if they were in a single-tenant environment. In some embodiments, storage nodes 230 that operate as in a multi-tenant environment may be implemented on different storage nodes (or on different virtual machines executing on a single host) than storage nodes that operate as in a single-tenant environment.

Figure 3:
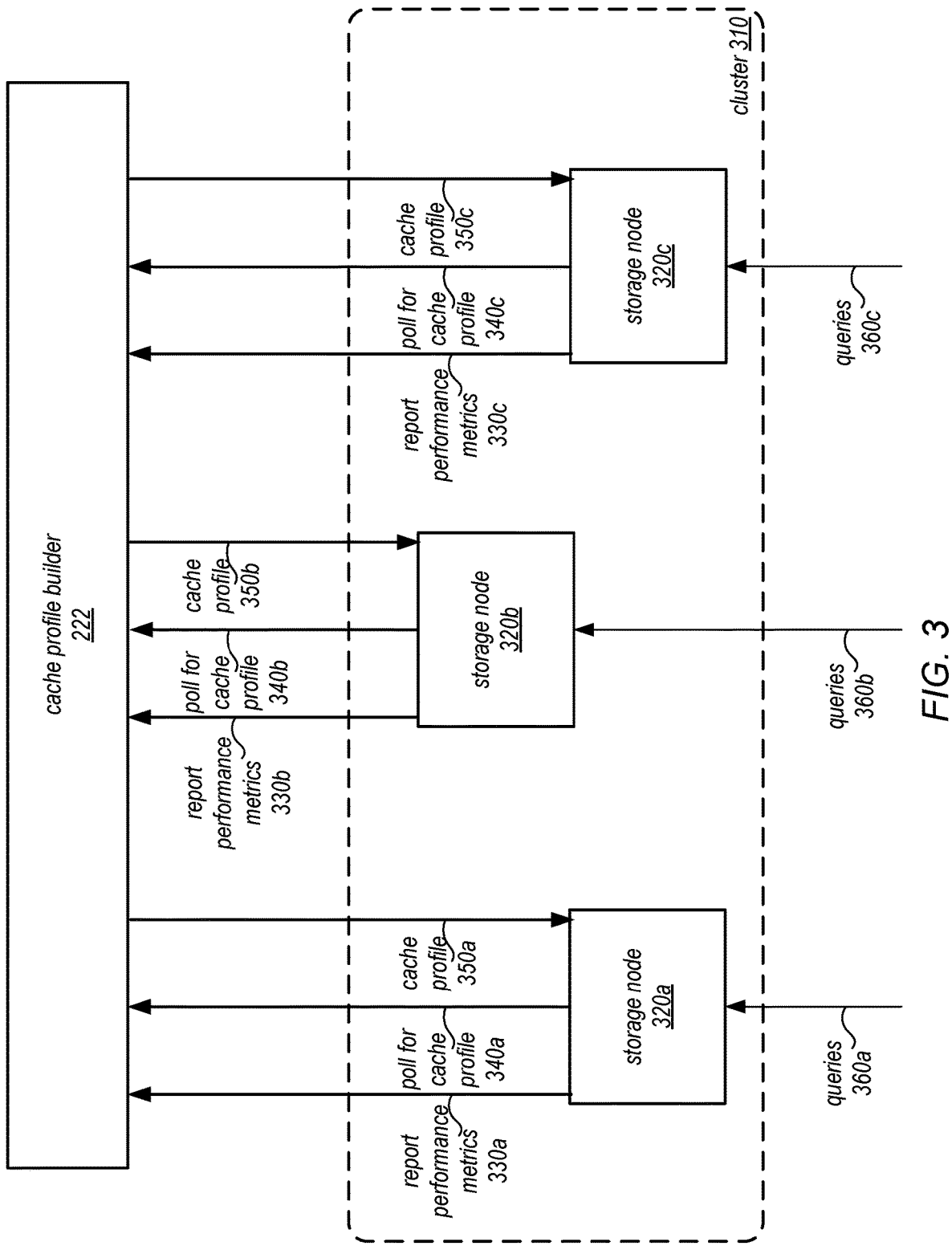
FIG. 3 is a logical block diagram illustrating a cache profile builder interacting with a cluster for a database, according to some embodiments.

FIG. 3 is a logical block diagram illustrating a cache profile builder interacting with a cluster for a database, according to some embodiments. Performance metrics for a single storage node may provide insightful information for implementing performance-based caching. In some embodiments, however, a group of storage nodes may together provide access to a same database. For example, one storage node may handle write traffic, while other storage nodes may handle read traffic (and receive updates from the storage node that handles write traffic in order to provide an update replica of the database). Moreover, the individual performance of storage nodes in a group may impact the performance of other storage nodes in the group. Therefore, implementing techniques to account for individual and group work for a database may be implemented.

For example, cache profile builder 222 may interact with a cluster 310 of storage nodes, such as storage nodes 320a, 320b, and 320c. These storage nodes, similar to storage nodes 230 in FIG. 2, may provide access to a database in response to queries, such as queries 360a, 360b, and 360c respectively. Storage nodes 320 may also report performance metrics, such as performance metric reports 330*a*, 330*b*, and 330*c* respectively, to cache profile builder. For example, reported metrics may include, but are not limited to, memory consumption or utilization, processor utilization, the number, type, or frequency of query plans stored in the cache (e.g., by labeling each type of query with an appropriate label), how frequently tables or objects are accessed by queries, a size of the table or object accessed by the queries, a time to service received queries using the plan cache, as well as various other workload characteristics, notification of failure or shutdown.

As discussed in detail below with regard to FIG. 6, cache profile builder 222 may generate cache profiles to guide the management of plan caches at storage nodes 320 by a respective cache controller. In at least some embodiments, storage nodes 320 may poll for or otherwise request for a new cache profile, such as poll requests 340*a*, 340*b*, and 340*c* respectively. If a cache profile has been generated for that storage node, then the cache profile may be provided, such as communications providing cache profiles 350*a*, 350*b*, and 350*c* respectively. Because storage node roles for processing queries to a database may differ, the cache profiles provided 350 to the different storage nodes may differ. If, for instance, one storage node receives a lot read traffic, then the cache profile for the storage node may include a large allowed size range for the plan cache, in some embodiments. Cache profiles may be provided 350 an independent times and/or in response to independent triggering events, as discussed below with regard to FIGS. 5-8, and therefore other notification models, such as push-based notification models for providing cache profiles may be alternatively be implemented in some embodiments.

Figure 4:
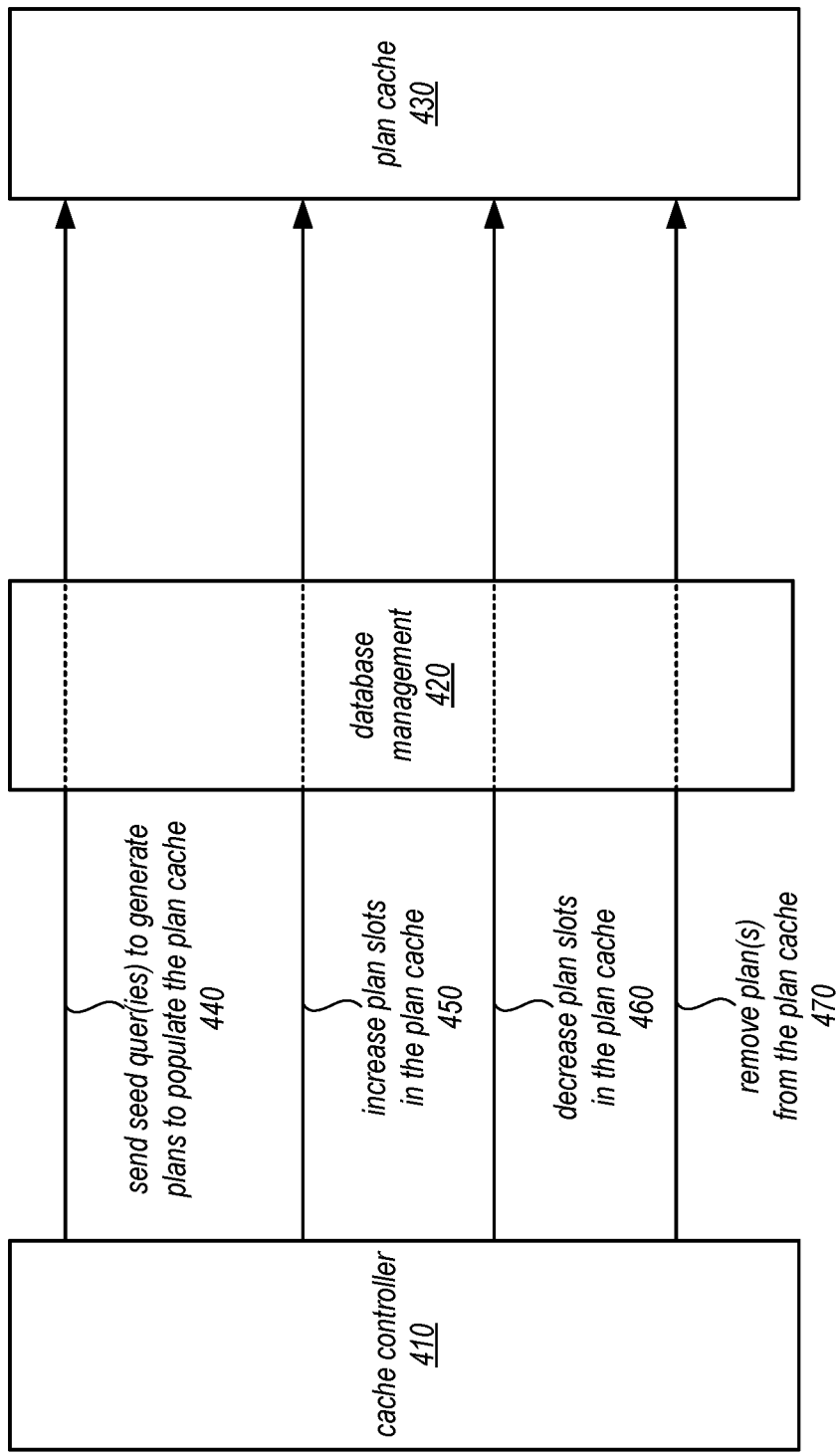
FIG. 4 is an example illustration of cache controller management operations to perform performance-based caching for query plans, according to some embodiments.

FIG. 4 is an example illustration of cache controller management operations to perform performance-based caching for query plans, according to some embodiments. Cache controller 410, similar to cache controller 240 in FIG. 2, may direct the performance of various management operations for a plan cache, such as plan cache 430 (which may be similar to plan cache 244 in FIG. 2). For example, cache controller 410 may utilize an interface or other input to database management 420 (similar to database management 232 in FIG. 2) to direct or cause performance of different operations. In this way, cache controller 410 may be implemented separately from database managements 420 and plan cache 430 (which may be implemented as part of the same query engine process or application) so that cache controller 410 may survive failures or restarts of the query engine application, in some embodiments. Cache management operations may, in various embodiments be directed in response to various conditions, events, or triggers, such as the techniques discussed below with regard to FIGS. 5-8.

For example, one direction cache controller 410 may provide is sending seed quer(ies) 440 to generate plans to populate the plan cache. For example, the seed queries may be SQL statements or other information determined for populating plan cache 430 may be obtained from persistent storage (e.g., storage 236 in FIG. 2). Cache controller 410 may then submit the queries as if they were from a client, triggering database management 420 to generate and store query plans in the cache.

In another example, cache controller 410 may submit requests to increase 450 or decrease 460 the number of plan slots in the plan cache, in some embodiments. Plan slots may provide an allocate space for storing a plan. The number of allocated plan slots may determine the size of plan cache 430. Increasing 450 or decreasing 460 the number of plan slots may optimize the size of the plan cache within memory for a storage node so that the number of slots in the plan cache are filled by a number of slots that reflects a number of different queries likely to be received at the database query engine (and which, in some embodiments, may benefit from a cached plan instead of generating a new plan).

In another example, cache controller 410 may remove plan(s) from the plan cache 470. If, for instance, a cache profile transition is being performed, cache controller 410 may submit requests 470 to remove all plans from the plan cache 430 in order to purge plan cache 430 before including new plans in the cache. In some embodiments, requests to remove plan(s) from the plan cache 450 may be performed as part of an eviction strategy or technique.

Figure 5:
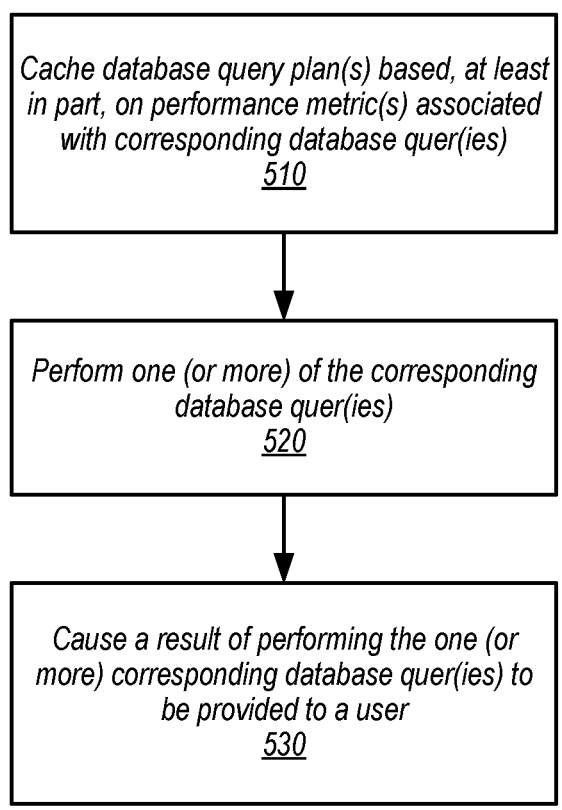
FIG. 5 is a high-level flowchart illustrating various methods and techniques to implement performance-based caching for query plans, according to some embodiments.

The examples of performance-based caching for query plans as discussed in FIGS. 2-4 above have been given in regard to a database service (e.g., a relational, non-relational or NoSQL database service that stores data on behalf of a client of the service). However, various other types of database systems, data processing systems, and/or data storage systems that provide access to data in response to queries may implement a performance-based caching for query plans, in other embodiments. FIG. 5 is a high-level flowchart illustrating various methods and techniques to implement performance-based caching for query plans, according to some embodiments. These techniques, as well as the techniques discussed with regard to FIGS. 6-8, may be implemented using components or systems as described above with regard to FIGS. 2-4, as well as other types of databases, storage engines, systems, or clients and thus the following discussion is not intended to be limiting as to the other types of systems that may implement the described techniques.

As indicated at 510, database query plan(s) may be cached, based at least in part, on performance metric(s) associated with corresponding database queries, in various embodiments. Database query plans, as discussed above, may provide a workflow, grouping, arrangement, and/or specification of the operations to perform a query. While parameters for a query may change (e.g., the predicate values to be satisfied, such as X in "score <=X from table players"), the query plans to perform associated queries may be reused, in various embodiments. Caching of database query plan(s) may be performed, in various embodiments, by analyzing the performance metrics of corresponding database queries. For example, as discussed above with regard to FIG. 3, a profile for a cache may be determined based on the performance metrics of queries and other operations of a database (whether at a single database query engine or the operations and/or other performance across a cluster of nodes). Eviction policies, as discussed below with regard to FIG. 6, for example may be selected for a query plan cache based on such performance metrics (e.g., most recently used, least recently used) or other selection criteria, such as user-supplied indications for the types of queries to be evicted (e.g., OLTP queries, OLAP queries, etc.). In some embodiments, the size of storage (e.g., memory) or number of slots (e.g., an allocated portion of memory for a plan) may be determined based on performance metrics for queries. As discussed below with regard to FIG. 9, performance metrics may be used to select seed queries for populating a plan cache for a database query engine based on performance metrics. Caching of database query plan(s) may, therefore, be proactively performed in various ways to anticipate the future use of the database, in some embodiments.

Performance metrics may provide various kinds or types of data that may be used to determine caching of database query plans. Performance metrics may indicate the workload of an individual query engine serving requests to a database and/or the workload of a cluster or other group of query engines (as discussed above with regard to FIG. 3) serving requests to a database. Performance metrics may indicate the status of individual nodes, hosts, or query engines, whether individually or as a group. System characteristics may also be indicated by performance metrics, in some embodiments. For example, utilization of a type of resource, such as memory utilization may indicate raw utilization information like total memory (e.g., 5 Gigabytes) and used memory (e.g., 3 Gigabytes). In some embodiments, performance metrics may indicate the data that is being accessed, frequency of access, or type of access (e.g., reads or writes to the data), such as indicating that table "users" receives X read requests per second. Various other examples, including those discussed above with regard to FIG. 4 may be utilized to perform caching of database query plans, and thus the previous examples are not intended to be limiting.

Evaluation of performance metrics to determine the caching of database query plans may be performed in various ways. For example, in some embodiments, the performance metrics may indicate the frequency or likelihood of a query being repeated. A time series analysis, for instance, may identify the frequency of queries compared to the cost of generating plans to perform the queries. Those queries that are unlikely to be repeated or more likely to be repeated with a lower cost to generate the plan and perform the query may not be selected as seed queries, for example, or more likely to be identified for eviction according to an eviction technique, in some embodiments. In another example, the time series analysis or frequency of queries may indicate an optimal size (or size range) that stores a likely number of query plans to be used. As discussed below with regard to FIG. 6, cache profiles may be determined using performance metrics in some embodiments, using various models, such as decision trees or machine learning developed models, such as deep neural networks, for classifying or selecting a cache profile for a query plan cache.

As indicated at 520, one (or more) of the corresponding database queries may be performed, in various embodiments. For example, a query may be received via an interface for a database (e.g., via an API request, protocol/driver interface, and/or according to query language or script, such as SQL). In response to receiving the query, a query signature or other feature identification may be performed to determine whether the query has a corresponding query plan that has been cached. For example, the signature or feature identifiers may be compared with an index or other set of metadata mapping cached query plans and queries to determine whether a corresponding query plan for the query is in the cache. If there is a hit at the cache so that the query has matching query plan in the cache, then the plan may be retrieved from storage in the cache and provided to a database query engine that received the query. In this way, the retrieved query plan may be used to perform the query instead of generating a new query plan to perform the query. Because parameter values may be different for a corresponding query, minor updates or alterations to instructions or operations identified by the query plan may be made, in some embodiments.

The database query engine may perform one or multiple operations to perform the query according to the query plan. Read operations to scan data, write operations to perform data manipulations to change data values, or various other operations to perform the query, such as operations to join, aggregate, filter, transform, or otherwise modify the data may be performed, among others, in some embodiments. A result of performing the one (or more) corresponding database quer(ies) may be caused to be provided to a user, in some embodiments. For example, result messages, communications, or other delivery mechanisms may be utilized to send query results to a system or device which may provide (e.g., display) the query results to the user. A same interface, protocol, or other format may be used to send query results as received the query, in some embodiments.

Figure 6:
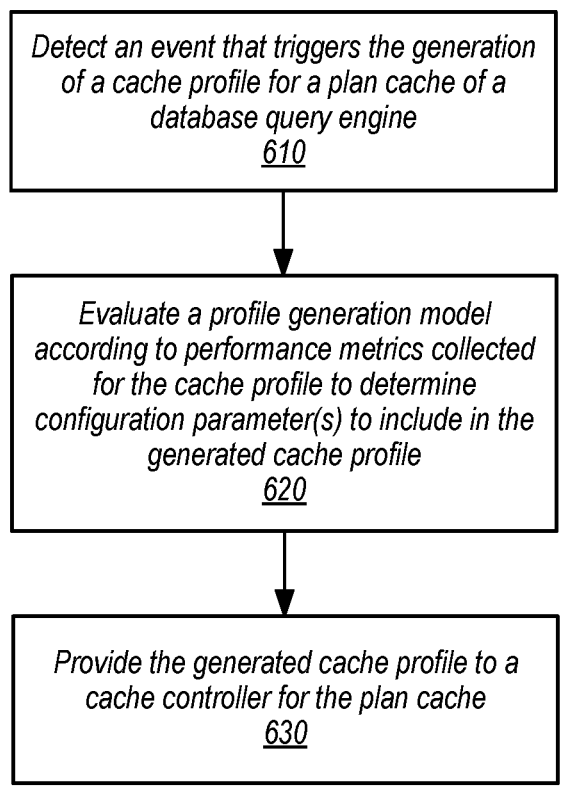
FIG. 6 is a high-level flowchart illustrating various methods and techniques to generate a cache profile for performance-based caching for query plans, according to some embodiments.

FIG. 6 is a high-level flowchart illustrating various methods and techniques to generate a cache profile for performance-based caching for query plans, according to some embodiments. As indicated at 610, an event that triggers the generation of a cache profile for a plan cache of database query engine may be detected, in some embodiments. For example, a cache profile builder, cache controller, or other system component that can access performance metrics for a query engine (or group of query engines) can monitor the performance metrics for trends or sustained performance changes, in some embodiments. Consider an example scenario where processor utilization is typically within 5% of 45% utilization for host of a query engine. A sustained change in processor utilization for the host, e.g., within 5% of 65% utilization for X period of time, may indicate a change in circumstances, workload, or other performance characteristics for the query engine. A cache profile building event may have criteria, such as the utilization change threshold, which may be evaluated and trigger the generation of the cache profile, in some embodiments.

Other events that trigger generation of a cache profile may be based on other types of data or criteria in addition to (or instead of) performance metrics. For example, time elapsed since the last time a cache profile was generated for a query engine. In some embodiments, cache profiles may be periodically generated and compared with previously generated cache profiles—if no significant different between the generated and previous cache profiles is determined, then the generated cache profile may be discarded. In some embodiments, events that trigger the generation of cache profiles may include requests (e.g., received via an interface, such as an API request) to generate a cache profile. For instance, a cache controller may request a new cache profile periodically or upon start/restart of a database query engine.

As indicated at 620, a profile generation model may be evaluated according to performance metrics collected for the cache profile to determine configuration parameters(s) to include in the generated cache profile, in various embodiments. A profile generation model may be a decision tree or other collection of selection rules that identify configuration parameters for a cache profile based on input metrics. For example, memory utilization metrics may be used to select minimum and maximum size configuration parameters for a cache according to mappings between utilization percentages and different size configurations. In some embodiments, pre-defined sets of cache profiles may be maintained for different types of host resources (e.g., a host of a database engine with X persistent storage, Y memory, Z network-bandwidth, etc.) so that the decision tree uses classification steps to classify the performance metrics for a host of an identified type for one of a set of cache profiles with pre-defined configuration parameters.

In some embodiments, machine learning techniques may be applied to generate a selection model for configuration parameters of a cache profile. Performance outcomes for various cache profile configurations that were previously selected based on identified performance metrics may be used to train a model, such as a deep neural network, to classify which performance metrics are optimally determinative for determining a cache profile, as well as which configuration parameters in the cache profile achieve optimum plan cache performance results, in some embodiments. Consider, for instance, an example where the model is trained to weight query plan types (e.g., scan plans, update or modification plans, and so on) as more determinative of the size of the plan cache than memory utilization. Performing such techniques may allow for cache profile building to adapt over time to collect smaller amounts of data that is more determinative of future cache profile generation, in some embodiments, reducing network traffic and other resources to maintain and transmit data that is not informative for cache profile generation purposes.

As discussed above, with regard to FIGS. 3 and 4, and below with regard to FIG. 7, configuration parameters of a cache profile may direct or inform the operations of a cache controller to cache database query plans. For example, configuration parameters may determine the minimum and maximum size of the cache, the timeframe for utilizing the cache profile, the number and size of entries, eviction plans, inclusion plans, and seed queries for populating the cache. The configuration parameters may be included in a data structure, message, or communication that specifies a cache profile, in various embodiments. As indicated at 630, the generated cache profile may be provided to a cache controller for the plan cache, as discussed above with regard to FIG. 3.

Figure 7:
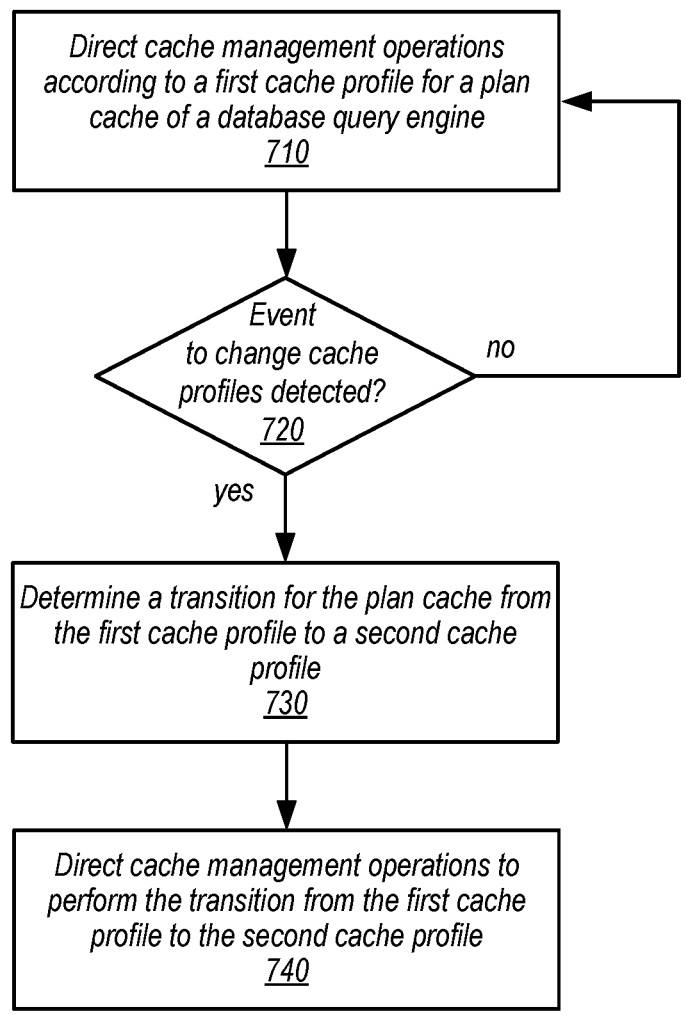
FIG. 7 is a high-level flowchart illustrating various methods and techniques to transition between cache profiles for a cache of query plans, according to some embodiments.

FIG. 7 is a high-level flowchart illustrating various methods and techniques to transition between cache profiles for a cache of query plans, according to some embodiments. As indicated at 710, cache management operations may be directed according to a first cache profile for a plan cache of a database query engine. As discussed above with regard to FIG. 4, a cache controller may identify plans in the cache to remove, change the size of the cache in memory, or populate the cache according to seed queries. In some embodiments, the cache controller may approve the inclusion of plans in the cache according to inclusion policies (e.g., only query plans of permitted types may be cached, only queries or query types indicated by user selections or submission may be included, etc.).

As indicated at 720, monitoring for an event to change cache profiles may be performed. If no event is detected, then management of the plan cache may continue according to the first cache profile. Events to change cache profiles may be detected in different scenarios. In some embodiments, cache profile changes may occur upon receiving a new cache profile (e.g., from a cache profile builder) in some embodiments. In some embodiments, profile change events may be triggered according to a schedule or other time-based event (e.g., described by the first cache profile) or according to cache controller configuration information. In some embodiments, the performance of the plan cache may trigger a change in cache profiles, such as the average latency of queries using a plan from the cache exceeding a threshold.

As indicated at 730, a transition for the plan cache from the first cache profile to a second cache profile may be determined, in some embodiments. Default transition settings, such as a workflow purge or removal plans from the cache, resize the cache, and populate the cache according to seed queries may be performed, in some embodiments. In this way, cache behavior may quickly change in response to the new plan. In some embodiments, the transition may be determined according to a settings or operations specified in the second cache profile. For example, the cache profile may include operations to prevent the inclusion of additional query plans in the cache generated in response to queries at the database engine, and instead begin populating the cache with plans based on seed queries. Various other transitions may be determined, depending on the configuration parameters changing from the first cache profile and the second cache profile, as well as the costs and benefits of a fast or slow transition, in some embodiments.

As indicated at 740, cache management operation to perform the transition from the first cache profile to the second cache profile may be performed, in various embodiments. Operations that halt or alter the utilization of the plan cache according to the first cache profile (e.g., changing eviction policies or inclusion policies, increasing or decreasing cache size or number of slots for plans, and so on) may be performed according to the timing or conditions specified in the transition, in some embodiments. If, for example, some operations to modify utilization are specified sequentially for the transition, then the different specified operations may be performed according to the sequence (e.g., populate the cache with seed queries→modify the eviction policy→change the size of the cache, and so on).

Figure 8:
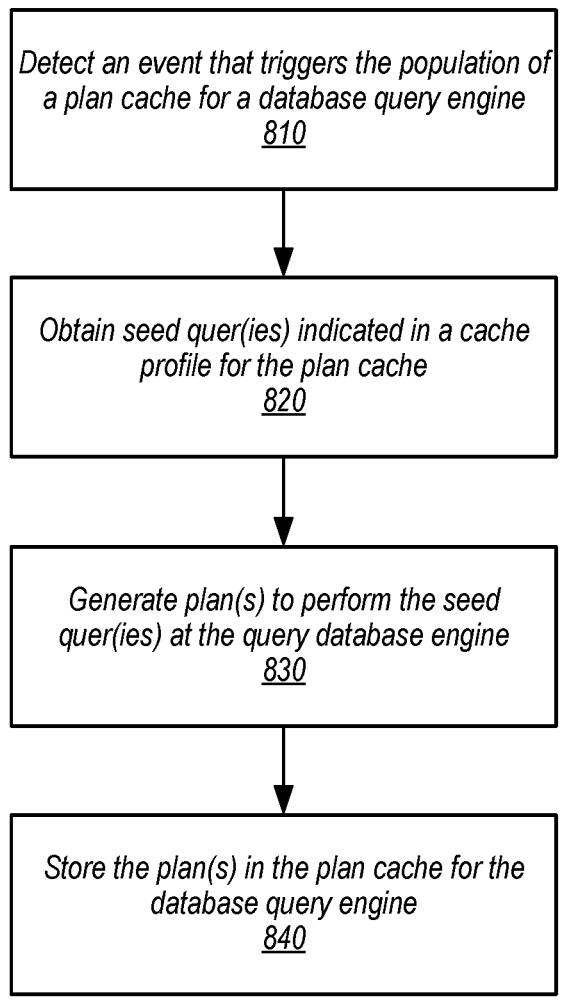
FIG. 8 is a high-level flowchart illustrating various methods and techniques to populate a cache of query plans according to a cache profile, according to some embodiments.

FIG. 8 is a high-level flowchart illustrating various methods and techniques to populate a cache of query plans according to a cache profile, according to some embodiments. As indicated at 810, an event that triggers the population of a plan cache for a database query engine may be detected, in some embodiments. Population event triggers may include transitions between cache profiles, in order to reset the cache to have contents that provide plans for likely queries, in some embodiments. A restart or initial start of a database query engine may also trigger a population event in some embodiments. Instead of waiting on the cache to warm using received queries, the population event may be performed as part of an initialization process for the database query engine in order to make the plan cache have a beneficial impact on query performance at the database query engine substantially faster.

As indicated at 820, seed quer(ies) indicated in a cache profile for the plan cache may be obtained, in some embodiments. For example, the cache profile may indicate a default storage location in persistent storage accessible to a cache controller that identifies the location of the seed quer(ies). In some embodiments, the seed queries may be found or identified when the cache profile is obtained. For example upon host restart, the cache controller may perform an initialization process to locate a cache profile for use. The cache controller may search a default storage location in persistent storage to obtain the last used cache profile for the database query engine at the host, in some embodiments.

As indicated at 830, plan(s) to perform the seed queries may be generated at the query database engine, in various embodiments. For example, the cache controller may inject, request, or otherwise provide the queries to the database query engine in order to perform the plan generation techniques used to generate a query plan. Once generated, as indicated at 840, the plan(s) may be stored in the plan cache for the database query engine, in some embodiments.

The methods described herein may in various embodiments be implemented by any combination of hardware and software. For example, in some embodiments, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
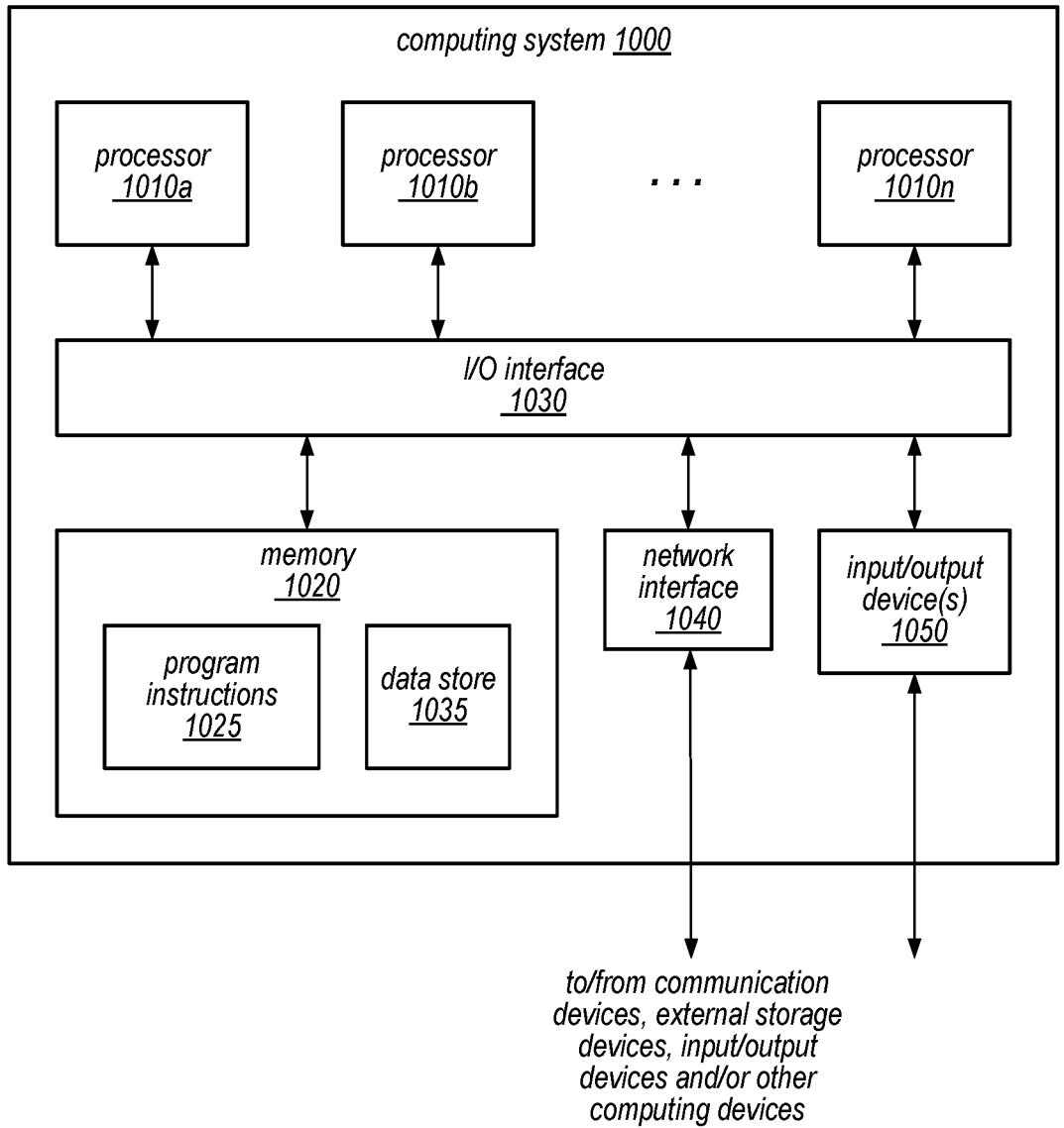
FIG. 9 is a block diagram illustrating an example computing system, according to some embodiments.

Embodiments of performance-based caching for query plans as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various embodiments of the systems as described herein, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a memory to store program instructions which, if performed by at least one processor, cause the at least one processor to perform a method to at least:
   cache one or more database query plans for a corresponding one or more database queries in the memory, the one or more database query plans cached according to a cache profile generated, based at least in part, on at least one performance metric associated with the corresponding one or more database queries;
   receive a request to perform a database query; and
   in response to the receipt of the request:
      identify the query as one of the corresponding one or more database queries;
      perform the one corresponding database query according to one of the cached databased query plans; and
      return a result of performing the one corresponding database query to a user.

2. The system of claim 1, wherein the method further causes the at least one processor to:
   evaluate, at a profile builder, a profile generation model according to the at least one performance metric to determine one or more configuration parameters to include the cache profile; and
   provide, by the profile builder, the cache profile to a cache controller to apply the cache profile to cache the one or more database query plans.

3. The system of claim 2, wherein the method further causes the at least one processor to:
   collect the at least one performance metric; and
   send the at least one performance metric to the profile builder.

4. The system of claim 1, wherein the at least one processor and the memory implement a storage node of a database service, wherein one or more other storage nodes of the database service provide access to a same database as the storage node, and wherein the cache profile is further based on additional program metrics for the one or more other storage nodes.

5. A method, comprising:
   caching one or more database query plans for a corresponding one or more database queries based, at least in part, on at least one performance metric associated with the corresponding one or more database queries;
   performing one or more of the corresponding one or more database queries; and causing a result of performing the one or more of the corresponding one or more database queries to be provided to a user.

6. The method of claim 5, wherein caching the one or more database query plans comprises:
   detecting an event that triggers population of a plan cache;
   obtaining one or more seed queries to populate the plan cache, wherein the one or more seed queries are the corresponding one or more database queries;
   generating the one or more database query plans to perform the one or more seed queries; and
   storing the one or more database query plans in the plan cache.

7. The method of claim 6, wherein the detection of the event triggers population of the plan cache occurs after a start or restart of a query engine that performs one or more of the corresponding one or more database queries and the causing the result of performing the one or more of the corresponding one or more database queries to be provided to the user.

8. The method of claim 5, further comprising generating a cache profile based, at least in part, on the at least one performance metric, wherein the caching of the one or more database query plans is performed in accordance with the cache profile.

9. The method of claim 5, wherein the one or more database query plans are cached for a first query engine implemented at a first storage node, wherein the generating of the cache profile is further based on at least one or more other performance metrics for a second query engine implemented at a second storage node.

10. The method of claim 5, wherein the caching of the one or more database query plans is performed in accordance with a first cache profile, and wherein the method further comprises:
    detecting an event to switch from the first cache profile to a second cache profile;
    determining a transition from the first cache profile to a second cache profile;
    directing, by a cache controller, one or more management operations according to the transition from the first cache profile to the second cache profile; and
    wherein one or more other database query plans corresponding to one or more other database queries are cached according to the second cache profile after the transition.

11. The method of claim 10, wherein at least one of the one or more management operations is an operation to remove at least one of the cached database query plans.

12. The method of claim 10, wherein at least one of the one or more management operations is an operation to change a memory allocation for the cached database query plans.

13. The method of claim 5, wherein the caching, the performing, and the causing are performed by a storage node implemented as part of a database service, wherein one or more other storage nodes of the database service provide access to a same database as the storage node, and wherein caching of other database query plans received at the one or more other storage nodes is performed based, at least in part, on at least one other performance metric for corresponding one or more other database queries received at the one or more other storage nodes.

14. A non-transitory, computer-readable storage medium, storing program instructions that when executed by one or more computing devices cause the one or more computing devices to implement:

identifying one or more database query plans, based at least in part, on at least one performance metric associated with a corresponding one or more database queries;
caching the one or more database query plans;
performing one or more of the corresponding one or more database queries; and
causing a result of performing the one or more of the corresponding one or more database queries to be provided to a user.

15. The non-transitory, computer-readable storage medium of claim 14, generating a cache profile based, at least in part, on the at least one performance metric and one or more user indicated queries for inclusion in the cache, wherein the identifying of the one or more database query plans is performed in accordance with the cache profile.

16. The non-transitory, computer-readable storage medium of claim 15, wherein the generating the cache profile is performed by a cache builder and wherein the program instructions cause the one or more computing devices to further implement:
    collecting the at least one performance metric; and
    sending the at least one performance metric to the profile builder.

17. The non-transitory, computer-readable storage medium of claim 15, wherein the program instructions cause the one or more computing devices to further implement evicting one or more other cached database query plans according to one or more selection criteria for eviction indicated by the cache profile.

18. The non-transitory, computer-readable storage medium of claim 14, wherein the identifying and the caching of the one or more database query plans is performed in accordance with a first cache profile, and wherein the program instructions cause the one or more computing devices to further implement:
    detecting an event to switch from the first cache profile to a second cache profile;
    determining a transition from the first cache profile to a second cache profile;
    directing, by a cache controller, one or more management operations according to the transition from the first cache profile to the second cache profile; and
    wherein one or more other database query plans corresponding to one or more other database queries are cached according to the second cache profile after the transition.

19. The non-transitory, computer-readable storage medium of claim 14,
    wherein, in identifying the one or more database query plans, the program instructions cause the one or more computing devices to implement obtaining one or more seed queries to populate the plan cache, wherein the one or more seed queries are the corresponding one or more database queries; and
    wherein, in caching the one or more database query plans, the program instructions cause the one or more computing devices to implement:
        generating the one or more database query plans to perform the one or more seed queries; and
        storing the one or more database query plans in the plan cache.

20. The non-transitory, computer-readable storage medium of claim 14, wherein the one or more computing devices implement a storage node implemented as part of a database service, wherein one or more other storage nodes of the database service provide access to a same database as the storage node, and wherein caching of other database query plans received at the one or more other storage nodes is performed based, at least in part, on at least one other performance metric for corresponding one or more other database queries received at the one or more other storage nodes.

* * * * *